3,201,182
THRUST BEARING
Harold M. Weissman, Peabody, Mass., assignor to General Motors Corporation, Detroit, Mich., a corporation of Delaware
Filed Mar. 28, 1962, Ser. No. 183,158
4 Claims. (Cl. 308—10)

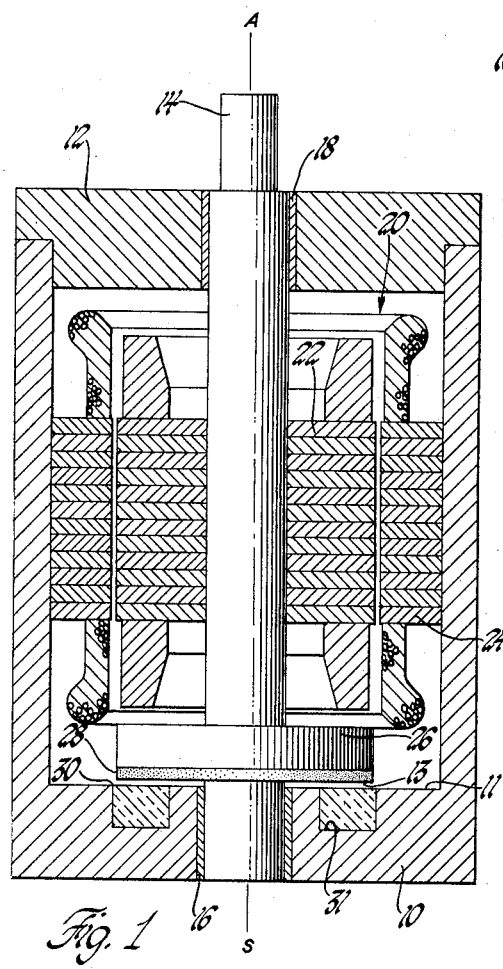

This invention relates to thrust bearings for resisting thrust forces along a shaft spin axis and more particularly to such bearings utilizing attractive and repelling forces.

Thrust bearings are well known in the prior art and are commonly used for resisting thrust forces along the spin axis of a rotating shaft member. One problem encountered in the use of such bearings is friction due to mechanical contact between the bearing member and the thrust plate. This problem has been minimized in the prior art with gas thrust bearings and magnetic thrust bearings wherein no mechanical contact of the thrust plate and bearing member is encountered. However, such bearings provide resistance to thrust forces in only one direction and two such bearings, for example one at each end of the shaft, are required to resist thrust forces in two opposed axial directions.

In accordance with this invention, a thrust bearing is provided for resisting thrust forces in two opposed axial directions. This is accomplished with a single thrust plate member mounted on a shaft for rotation therewith. Another member is provided in close proximity to the thrust plate member and fluid under pressure between the members exerts a repelling force therebetween and attractive force producing means provide attractive forces between the members. The attractive and repelling forces are adjusted so as to be equal and opposite at a predetermined axial spacing between the members whereby axial displacements of one of the members with respect to the other due to external forces are resisted.

A more complete understanding of this invention may be had from the detailed description which follows taken in conjunction with the drawings in which:

FIGURE 1 is a plan view partly in section of one embodiment of the invention;

FIGURE 2 is a plan view partly in section of a second embodiment of the invention;

FIGURE 3 is a schematic circuit diagram of an electrical circuit which may be used in conjunction with the embodiment of the invention shown in FIG. 2;

FIGURE 4 is a graphical representation of attractive and repelling forces versus clearance between a thrust plate member and an attractive force producing member.

Referring now to the drawing and more particularly to FIGURE 1 there is shown a hollow cylindrical casing 10 filled with fluid and having an end plate 12 secured thereto. A shaft 14 is rotatably supported by journal bearings 16 and 18 in the casing 10 and end plate 12, respectively. A motor 20 is provided within the casing 10 and comprises a stator member 24 secured to the casing 10 and a rotor member 22 secured to the shaft 14 for providing angular rotation of the shaft about its spin axis SA. A cylindrical thrust plate 26 constructed of magnetic material is mounted on the shaft 14 for rotation therewith in close proximity to an inner surface 11 of the casing 10. The plate 26 is provided with a non-magnetic coating 28 defining a spacing 13 with the inner surface 11. An annular permanent magnet 30 is mounted in an annular groove 31 in the casing 10 so as to provide attractive magnetic forces between the thrust plate 26 and the magnet 30.

When the motor 20 is energized providing rotative force to the shaft 14, hydrodynamic gas pressure will be developed in the spacing 13. The pressure is developed due to the angular velocity of plate 26 and the close spacing between coating 28 on the plate 26 and the inner surface 11. The pressure will increase with increases in angular velocity of the plate 26 and with decreases in the narrowness of spacing 13. This pressure may be considered as a repelling force since it tends to push the thrust plate 26 from the surface 11. The repelling force is opposed by the attractive magnetic forces between the thrust plate 26 and the magnet 30. If the plate 26 is axially displaced until the attractive and repelling forces are equal in magnitude and opposite in direction the spacing 13 will correspond to a null or no-load condition of the bearing. The null position may be adjusted for the desired length of spacing 13 by varying the attractive and repelling forces. The attractive force may be varied by varying the strength of the magnet 30 and the repelling force may be varied by varying the angular velocity of the thrust plate 26. The attractive magnetic forces as well as the repelling forces due to the gas pressure will vary exponentially with variations in clearance between the inner surface 11 and the thrust plate 26. However, for stability purposes it is desirable that the bearing operate in a substantially constant portion of a curve representing the magnetic force. Hence, by making the magnetic force clearance greater than the gas bearing clearance the magnetic forces may be maintained relatively constant over the total range of the repelling forces. This is accomplished with the non-magnetic coating 28 on the thrust plate 26.

In operation, when the thrust plate 26 is in its null position any external force acting on the shaft 14 tending to displace it along its spin axis SA will be opposed by the attractive and repelling forces existing in the spacing 13. This is more readily understood by reference to FIGURE 4 which shows a graphical representation of attractive force versus the attractive force clearance and of repelling force versus the repelling force clearance. The repelling force clearance is equal to the spacing 13 whereas the attractive force clearance is equal to the spacing 13 plus the thickness of the non-magnetic coating 28. The repelling force varies exponentially with variations in the length of the spacing 13 whereas the attractive force is maintained constant due to the coating 28. The intersection of the curve of repelling force with the curve of attractive force represents the null or no load condition of the thrust bearing. It is seen from FIGURE 4 that if an external force acts to displace the shaft 14 along its spin axis SA a distance S so as to decrease the spacing 13 an increased repelling force F will result opposing such displacement. Conversely, if an external force acts to displace the shaft 14 along its spin axis SA a distance S' so as to increase the spacing 13 a decreased repelling force F' will result whereby the attractive force will predominate opposing such displacement. It is seen that the stiffness of the bearing, i.e. the ability of the bearing to resist thrust forces in two opposing axial directions, may be increased by increasing the level of attractive force in the spacing 13 since the slope of the curve representing repelling force is steeper for higher values of attractive force than for lower value. Thus the gas magnetic bearing may be preloaded by varying the field strength of the magnet 30.

In FIGURE 2 there is shown a second embodiment of the invention comprising a hollow cylindrical casing 100 filled with fluid and having end plates 102 and 104 secured thereto. A shaft 106 is rotatably supported within the casing with journal bearings 108 and 110 in the end plates 102 and 104, respectively. A motor 112 is provided within the casing 100 and comprises a stator member 114 and a rotor member 116 secured to the shaft 106 for providing angular rotation of the shaft about its spin axis S'A'. A disc shaped electrically conductive thrust plate 118 is suitably secured to one end of the shaft 106 for rotation therewith. Two conductive plates 120 and 122 insulated from each other with an insulator 124 and together forming a second disc 125 of approximately the same surface area as the plate 118 are mounted in a recess 126 in the end plate 104. A dielectric coating 128 is provided on the thrust plate 118 defining a spacing 130 with the disc 125. The plate 118 and the disc 125 with the appropriate circuitry as shown in FIGURE 3 provide attractive electrostatic forces in the spacing 130.

Suitable circuit means are provided which connect the plate 120 through a switch 134 with the negative terminal of a battery 132 and connect the plate 122 with the positive terminal of the battery 132 as shown in FIGURE 4. Since the plate 118 is a common conductor it acts as a common capacitor plate.

Upon closure of switch 134 the plate 120 will be negative with respect to the plate 122 and since plate 118 is common an electrostatic field will be obtained between the disc 125 and the thrust plate 118. The forces due to the electrostatic field are attractive since they tend to pull the thrust plate 118 and the disc 125 together.

The attractive electrostatic forces as well as the repelling forces due to gas pressure will vary exponentially with variations in clearance between the inner surface 118 and the thrust plate 125. However, for stability purposes it is desirable that the bearing operate in a substantially constant portion of a curve representing the electrostatic force. Hence, by making the electrostatic force clearance greater than the gas bearing clearance the electrostatic forces may be maintained relatively constant over the total range of the repelling forces. This is accomplished with the dielectric coating 128 on the thrust plate 118.

The operation of the embodiment of the invention shown in FIGURE 2 is similar to that of the embodiment shown in FIGURE 1 and hence a more detailed description is not necessary for a clear understanding of the invention. Preloading of the bearing may be obtained by varying the voltage of battery 132 so as to increase the electrostatic forces in the spacing 130.

Although the description of this invention has been given with respect to two particular embodiments, it is not to be construed in a limiting sense. Numerous variations and modifications within the spirit and scope of the invention will now occur to those skilled in the art. For a definition of the invention, reference is made to the appended claims.

I claim:

1. A gas magnetic thrust bearing for resisting thrust forces along the spin axis of a rotating member, means associated with the member for providing rotation thereof about the spin axis, a first thrust plate of magnetic material mounted on the member coaxially of and normal to the spin axis for rotation therewith, a stationary thrust plate normal to the spin axis and located in close proximity to the first thrust plate defining a first spacing therebetween, the first thrust plate having a non-magnetic coating thereon defining a second spacing with the stationary thrust plate, a gaseous medium in the second spacing, whereby relative rotation of the plates produces hydrodynamic gas pressure in the second spacing for providing repelling forces between the plates, and a permanent magnet mounted to the stationary thrust plate for providing attractive forces in the first spacing between the plates, the first spacing being greater than the second spacing so that the rate of change of attractive forces as a function of displacement is different from the rate of change of repelling force due to gas pressure as a function of displacement, the plates being subject to relative rotation to be urged toward an axial disposition wherein the repelling and attractive forces are equalized.

2. A gas electrostatic thrust bearing for resisting thrust forces along the spin axis of a rotating member and comprising a rotatable member having a spin axis, means associated with the member for providing rotation thereof about the spin axis, a first thrust plate of conductive material mounted on the member coaxially of and normal to the spin axis for rotation therewith, a stationary thrust plate normal to the spin axis and located in close proximity to the first thrust plate defining a first spacing therebetween, the first thrust plate having a dielectric coating thereon defining a second spacing with the stationary thrust plate, a gaseous medium in the second spacing, whereby relative rotation of the plates develops a hydrodynamic gas pressure in the second spacing for providing repelling forces between the plates, the stationary thrust plate including first and second electrically conductive segments, insulating means electrically insulating the first segment from the second segment, and a source of voltage connected across the segments, the segments coacting together with the first plate to develop attractive electrostatic forces between the first plate and the stationary plate, the first spacing being greater than the second spacing so that the rate of change of attractive forces as a function of displacement is different from the rate of change of repelling force due to gas pressure as a function of displacement, the plates being responsive to relative rotation thereto to be urged toward an axial position wherein the attractive and repelling forces are equalized.

3. Combination force producing means for maintaining a predetermined spacing between two relatively rotatable members having parallel adjacent surfaces comprising: means for producing an attractive force between the members of a magnitude related to the distance between the surfaces of the members, inactive means uniformly disposed over one of the surfaces and unresponsive to the force produced by the first means, a gaseous medium in the space between the inactive means and the other of the surfaces whereby relative rotation of the members produces a repelling force due to hydrodyamic gas pressure between the inactive means and said other of the surfaces, the repelling force being of a magnitude related to the distance between the inactive means and said other of the surfaces, and means for producing relative rotation of the members whereby the members are urged toward a relative position wherein the attractive and repelling forces are equalized.

4. Combination bearing means for restraining displacement of a rotatable member along the axis of rotation thereof, including means defining a first thrust surface on the rotatable member normal to the axis of rotation thereof, a second thrust surface disposed parallel to the first thrust surface and space therefrom, means associated with the first and second thrust surfaces for producing an attractive force of a magnitude related to the distance between the first and second surfaces, an inactive material uniformly disposed over one of the surfaces and unresponsive to the attractive force produced by the producing means, a gaseous medium in the space between the inactive material and said surfaces for producing a hydrodynamic gas pressure force tending to separate the surfaces upon rotation of the member, the magnitude of the gas pressure force being related to the distance between the inactive material and the other of said surfaces, and means for rotating the member whereby the member is urged toward an axial position wherein the attractive and separating forces are equalized.

References Cited by the Examiner

UNITED STATES PATENTS 2,809,526 10/57 Lundberg _____ 308—10
3,026,151 3/62 Buchhold _____ 307—10

MILTON O. HIRSHFIELD, *Primary Examiner.*